United States Patent [19]

Buckreuss

[11] Patent Number: 6,005,509

[45] Date of Patent: Dec. 21, 1999

[54] METHOD OF SYNCHRONIZING NAVIGATION MEASUREMENT DATA WITH S.A.R RADAR DATA, AND DEVICE FOR EXECUTING THIS METHOD

[75] Inventor: Stefan Buckreuss, München, Germany

[73] Assignee: Deutsches Zentrum fur Luft-und Raumfahrt e.V., Bonn, Germany

[21] Appl. No.: 09/113,292

[22] Filed: Jul. 10, 1998

[30] Foreign Application Priority Data

Jul. 15, 1997 [DE] Germany .......................... 197 30 306

[51] Int. Cl.[6] ........................................ G01S 13/90
[52] U.S. Cl. ............................... 342/25; 349/189
[58] Field of Search ........................... 342/25, 189, 192, 342/194, 195, 196, 203

[56] References Cited

U.S. PATENT DOCUMENTS

| 5,166,688 | 11/1992 | Moreira ............................ 342/25 |
| 5,327,140 | 7/1994 | Buckreuss ........................ 342/25 |
| 5,590,044 | 12/1996 | Buckreuss ........................ 364/453 |
| 5,815,111 | 9/1998 | Gouenard et al. ................ 342/25 |

FOREIGN PATENT DOCUMENTS 361013372A  1/1986  Japan .................. G06F 15/62

OTHER PUBLICATIONS

Lord, Richard T. et al, "High range resolution radar using narrowband linear chirps offset in frequency", Comsig '97, pp. 9–12.

Doren, N. et al, "Implementation of Sar interferometric map generation using parallel processors", Igarss '98, vol. 5, pp. 2640–2642, 1998.

Sharif, Amir H. A. et al, "Doppler centroid estimation for azimuth–offset Sars", Naecon '95, vol. 1, pp. 134–139, 1998.

Goblirsch, W., "Motion errors in airborne Sar interferometry", Igarss '98, vol. 5, pp. 2668–2670.

*Primary Examiner*—John B. Sotomayor
*Attorney, Agent, or Firm*—Browdy and Neimark

[57] ABSTRACT

In a method of synchronizing navigation measurement data according to the invention, first radar data are evaluated by means of the reflectivity-offset method, by means of which the aircraft deviation in the antenna viewing direction is determined. The aircraft deviation in this direction is also determined from the outputs of a navigation system. The temporal courses of the two obtained deviations are cross-correlated. The position of the cross-correlation maximum is determined, and indicates the temporal offset between two associated deviation signals. The radar data are delayed by this amount of time, so synchronization is effected between navigation measurement data and radar data. An optimum compensation of the motion errors can be effected with the synchronized data. The invention can be used in on-board aircraft SAR systems.

19 Claims, 4 Drawing Sheets

METHOD OF SYNCHRONIZING NAVIGATION MEASUREMENT DATA WITH S.A.R RADAR DATA, AND DEVICE FOR EXECUTING THIS METHOD

FIELD OF THE INVENTION

The invention relates to a method and apparatus for synchronizing navigation measurement data with SAR radar data.

REVIEW OF THE RELATED TECHNOLOGY

Known on-board aircraft radar systems with a synthetic aperture (SAR) operate in the so-called L, C and X bands. A radar system of this type serves in imaging the earth's surface along the flight path. The radar antenna is oriented perpendicular to the flight direction and diagonally downward. The image points of the resulting map represent the radar reflectivity of the objects on the ground.

A general prerequisite in the processing of the radar image is ideal flight conditions, which means that the course, position and forward velocity are assumed to be constant. In a practical case, however, these ideal conditions are not present, because the aircraft is diverted from its nominal flight path by turbulence, and its forward velocity varies. Deviations from the flight height and lateral deviations from the flight direction cause a variation in the diagonal distance between the radar antenna and the illuminated target on the ground, and thus affect the phase course of the backscatter signal. The variation in the forward velocity additionally prevents an equidistant scanning of the illuminated strip of land. The motion errors have a negative influence on the azimuth compression, and lead to a drop in the quality of the processed radar images, which causes geometrical distortions, poor resolution and a decrease in contrast.

The reflectivity-offset method is described in patent publication DE 39 22 428 C2 (corresponding to U.S. Pat. No. 5,166,688 to Moreira). U.S. Pat. No. 5,166,688 refers to this method as the "reflectivity-displacement method". The Moreira method is outlined in FIG. 4 of US Pat. No. '688 and described at column 5, line 57 et seq.

Numerous methods and devices for improving the image quality in this regard are already known. One possibility lies in correcting the phase errors and readjusting the pulse-repetition frequency. In this connection, patent publications DE 42 25 413 (corresponding to U.S. Pat. No. 5,327,140) and DE 44 03 190 (corresponding to U.S. Pat. No. 5,590,044) disclose a useful method that permits the calculation of the described motion errors and the necessary correction parameters from the measurement data of an inertial course/position reference system.

The contents of U.S. Pat. Nos. 5,166,688, 5,327,140, and 5,590,044 are entirely incorporated herein by reference.

Navigation systems of any type, however, output the position data with a certain time delay, so these data follow the radar signal by a certain amount of time. In addition to the internal delay of the navigation system, further delays occur in the transmission, recording or processing of the position data.

To assure optimum compensation of the motion errors, the navigation measurement data should be allocated as precisely as possible to the radar data. The precision of the time synchronization should be in the millisecond range.

With conventional means, the delays in the transmission, storage or processing of the navigation measurement data can be determined by a measurement of the signal travel times directly at the hardware. To determine the internal delay of the navigation measurement system, the time span between the initiation of a movement and the output of the corresponding data would have to be suitably measured. In most cases, however, one must rely on information from the manufacturer. It must also be considered that delays also occur in the transmission, storage or processing of the radar data in the SAR radar system. These delays must be considered in relation to the aforementioned delays in navigation measurement data, because ultimately only the overall delay time is relevant.

A disadvantage of the known method of motion-error compensation of SAR images is that the delay times occurring in the generation, transmission, storage or processing of the navigation measurement data and the radar data cannot be determined completely or precisely through measurement. Another disadvantage is that the described delay times are strongly dependent on the respectively used hardware and software. Even in navigation devices of the same type and manufacturer, these delays are subjected to individual variations. In an exchange or modification of individual components of the navigation or radar system, the delay times must be measured again. Long-term fluctuations in the delay times can only be detected through continuous re-measurement. A further disadvantage is that the measuring method itself can also involve delay times.

SUMMARY OF THE INVENTION

It is an object of the invention to provide a method of compensating motion errors of SAR images, and thus improve the SAR image quality, and a device for executing this method, which method and device permit the measurement of the delay times of both the navigation measurement data and the radar data, as well as a synchronization of the navigation measurement data with the associated radar data before the actual motion-error compensation is effected.

In one embodiment, the present method utilizes the method of supporting the outputs of an inertial system by means of additional navigation systems. The time offset between navigation measurement data and radar data is then determined as follows:

1. First, the radar data are evaluated in accordance with the reflectivity-offset method, so the deviation of the carrier (aircraft) in the antenna viewing direction can be determined. As dictated by mathematical/physical principles, the deviation course (i.e. deviation function) is not offset in any way with respect to the radar data, because it was obtained from these very radar data.

2. The deviation of the carrier in the antenna viewing direction is determined from the outputs of a navigation system.

3. The temporal courses of the deviation signals obtained with the reflectivity-offset method and by means of the navigation system are cross-correlated.

4. The position of the maximum of the cross-correlation is determined; it indicates the time offset between the two signals.

5. The radar data are delayed by this temporal amount. This effects the synchronization between associated navigation measurement data and radar data. An error-free compensation of motion errors in the radar data can be effected in the SAR image generation because of the synchronous condition.

In comparison to a method of measuring directly at the hardware, the use of the method of the invention offers numerous advantages. The delay time between the navigation measurement data and the radar data can be detected over the entire system (that is, from detection to recording or processing of the data) with a single measurement. The delay time can be measured prior to each SAR image processing, so long-term fluctuations of the time offset can be determined. The measurement of the delay time is independent of the used navigation method. Modifications of the hardware of the navigation system do not influence the measurement. The measurement according to the method of the invention is effected without a delay.

BRIEF DESCRIPTION OF THE DRAWING

The above and other objects and the nature and advantages of the present invention will become more apparent from the following detailed description the method of the invention and a device for executing this method described below by way of a preferred embodiment in conjunction with the attached drawings, wherein.

DETAILED DESCRIPTION OF THE PREFERRED EMBODIMENT

Figure 1:
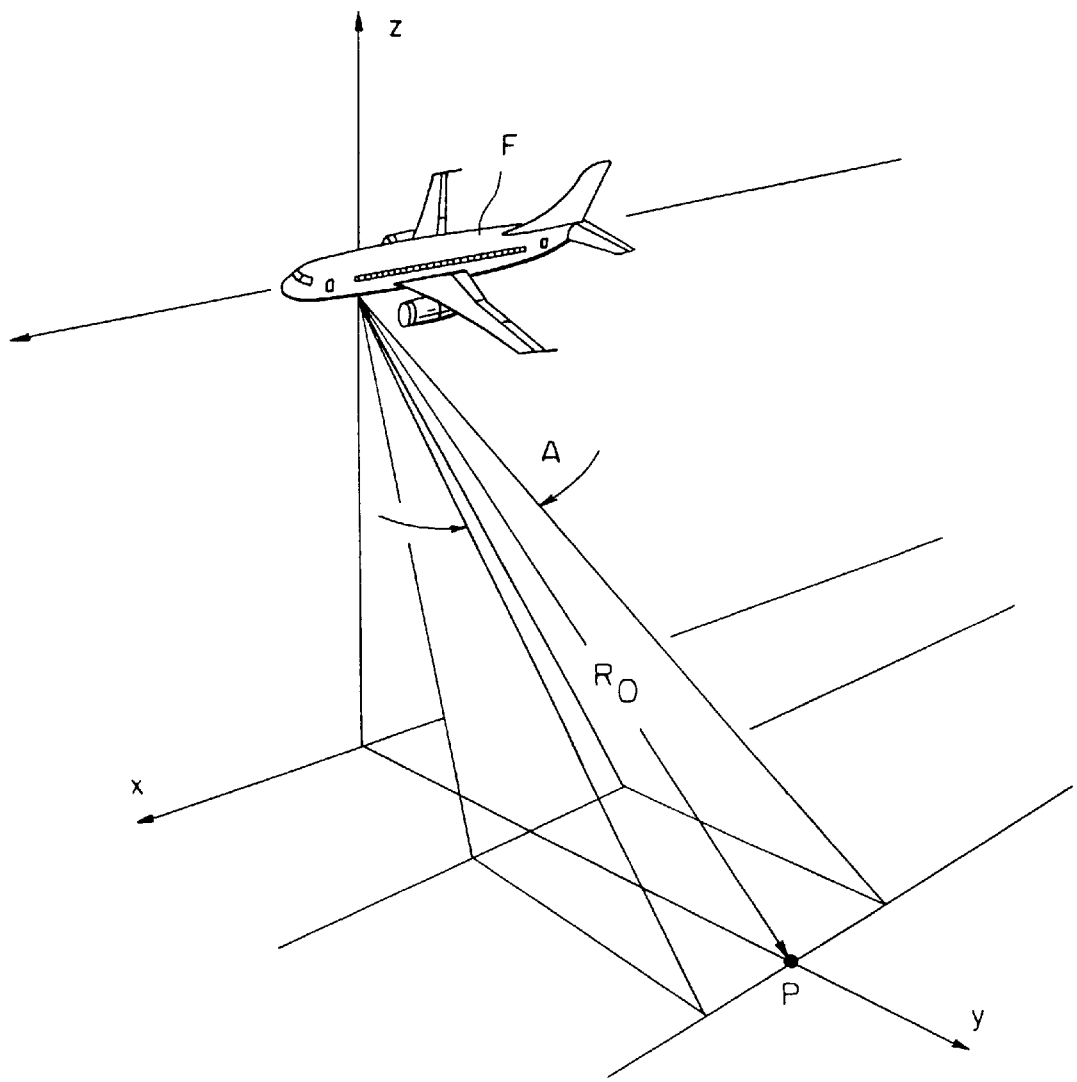
FIG. 1 is a schematic representation of the geometrical situation for an on-board aircraft SAR, and the selection of the coordinate system.

FIG. 1 schematically shows the geometrical situation for an on-board aircraft SAR, and the selection of the spatial coordinate system x, y and z. An aircraft F is intended to move in a nominal forward flight direction x; the direction transverse and horizontal to the nominal flight direction is indicated by y, and the height direction is indicated by z. The minimum diagonal distance from a point P on the ground is indicated by $R_0$, and the azimuth overlap angle is indicated by $\theta_A$.

The expressions used in the ensuing explanation of the method of the invention have the following meanings:

$H_0$, average flight height above the ground;

K(t), correlation result;

$K_{RDM}(t)$, correlation result (reflectivity-offset method);

S(t), radar backscatter signal;

$A_0$, signal amplitude;

$\phi(t)$, nominal phase course (or, function);

$\phi_{err}(t)$, phase errors due to deviation from set flight path;

$R_0$, minimum diagonal distance from a point on the ground;

$\Delta r_{NAV}(t)$, deviation in the viewing direction from the navigation calculation;

$\Delta r_{RDM}(t)$, deviation in the viewing direction from the calculation according to the reflectivity-offset method;

$\Delta t$, time offset between the radar and navigation measurement data;

$\Delta t_{RDM}(t)$, step size for calculation according to the reflectivity-offset method;

$v_x(t)$, forward velocity;

$\Delta y(t)$, horizontal deviation transversely to the nominal flight direction;

$\Delta z(t)$, variation in the flight height;

$\lambda$, wavelength; and $\theta_D$, antenna depression angle.

Figure 2:
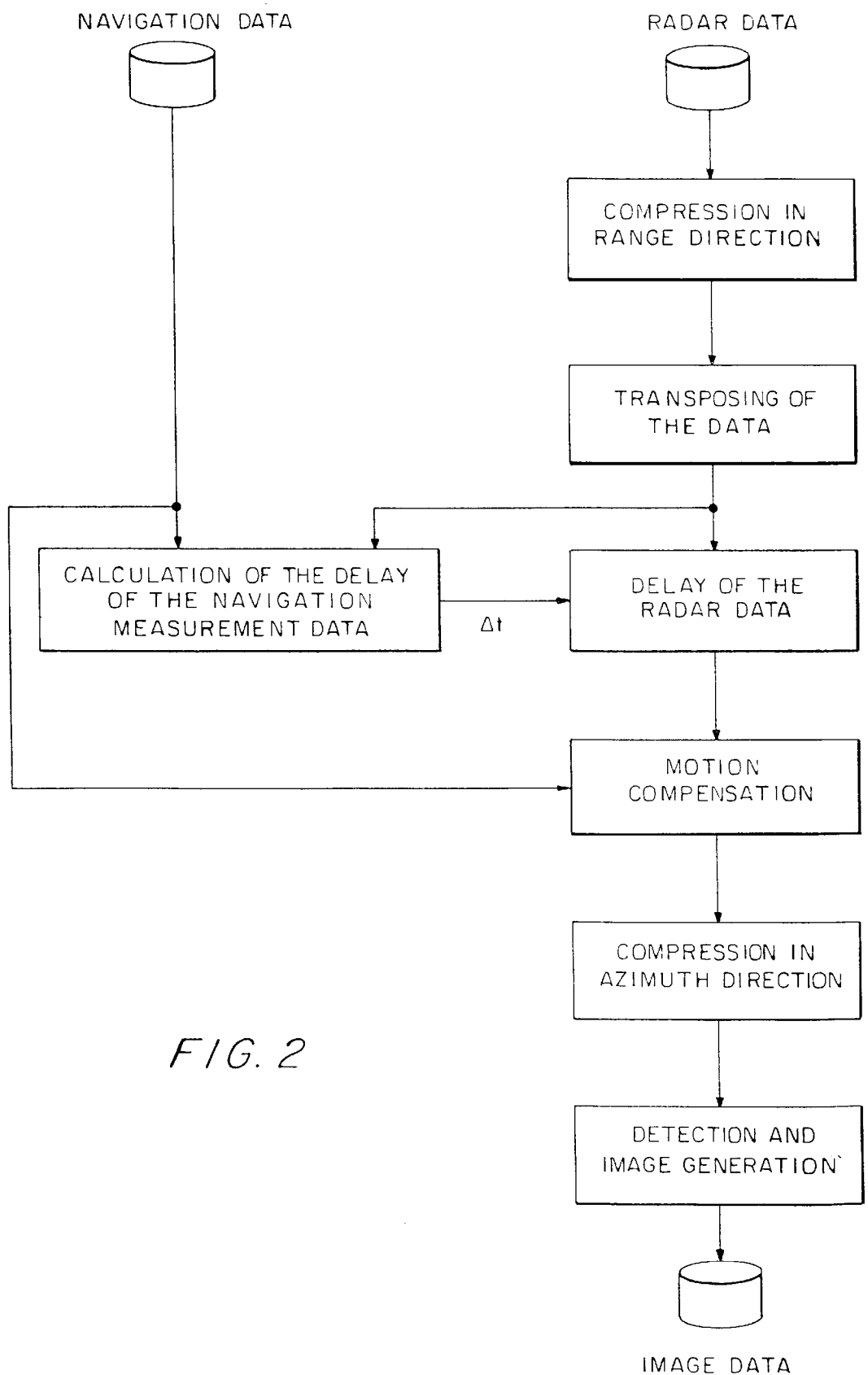
FIG. 2 is a schematic block diagram of a device for executing the signal-processing method for SAR processing with motion compensation, with the use of a synchronization of the navigation measurement data.

FIG. 2 illustrates the principle procedure of SAR processing described below for a device for executing the SAR signal-processing method with motion compensation according to the invention. The process comprises the following steps:

The received SAR radar data are first compressed in the distance direction. For energy reasons, pulses expanded by the radar, preferably frequency-modulated pulses having a quadratic phase course, or so-called chirp pulses, are transmitted and correlated with a replica of this signal following reception. In a radar having a synthetic aperture (SAR), this is referred to as range compression or compression in the distance direction. Following a transposition of the compressed radar data, a delay by a time period $\Delta t$ is effected for synchronizing the compressed data with the associated navigation measurement data. The time period $\Delta t$ corresponds to the time period by which the navigation measurement data follow the radar data. The time period $\Delta t$ is calculated. The method of calculating the time period $\Delta t$ is explained in detail below in conjunction with FIGS. 3 through 5.

The following motion-error compensation encompasses a plurality of steps. The forward velocity $v_x(t)$ is corrected. A consequence of the variation in the forward velocity, that is, the velocity in the x direction, is that the illuminated strips of land are no longer scanned equidistantly through the pulse-repetition frequency (PRF) of the radar.

During a fly-over, this motion error can be compensated by the online readjustment of the pulse-repetition frequency. Offline, a resampling must be performed, i.e., an interpolation and re-scanning of the raw radar data. Within the framework of motion-error compensation, a deviation correction must also be performed. The deviation in the diagonal distance specifically causes an erroneous allocation of the backscatter signal to the corresponding distance gates, in addition to the phase error.

An additional delay of the radar echo signal prior to the phase correction can eliminate this interfering effect. The phase correction should compensate a phase error caused by a deviation from the set flight path. The radar backscatter signal S(t) can be described as follows:

$$S(t) = A_0 \cdot e^{j\phi(t)} \cdot e^{j\phi_{err}(t)} \qquad (1)$$

Here $A_0$ is the signal amplitude, $\phi(t)$ is the nominal phase course, and $\phi_{err}(t)$ is the phase error caused by the deviation from the set flight path. To correct the phase error, the backscatter signal S(t) is multiplied by the conjugate complex phase-error term $e^{-j\phi_{err}(t)}$. A compression in the azimuth direction follows the motion-error compensation.

The backscatter signal possesses an approximately quadratic phase course due to the change in the diagonal distance as the aircraft flies past the illuminated target. The point target responses in the azimuth direction are obtained through the correlation of this backscatter signal with a function that can be calculated a priori and has the same phase course. This process is also referred to as azimuth compression.

The measurement results of a navigation system such as a GPS (Global Positioning System) receiver, an inertial navigation system (INS) or a combination of these methods are used as navigation measurement data.

Figure 3:
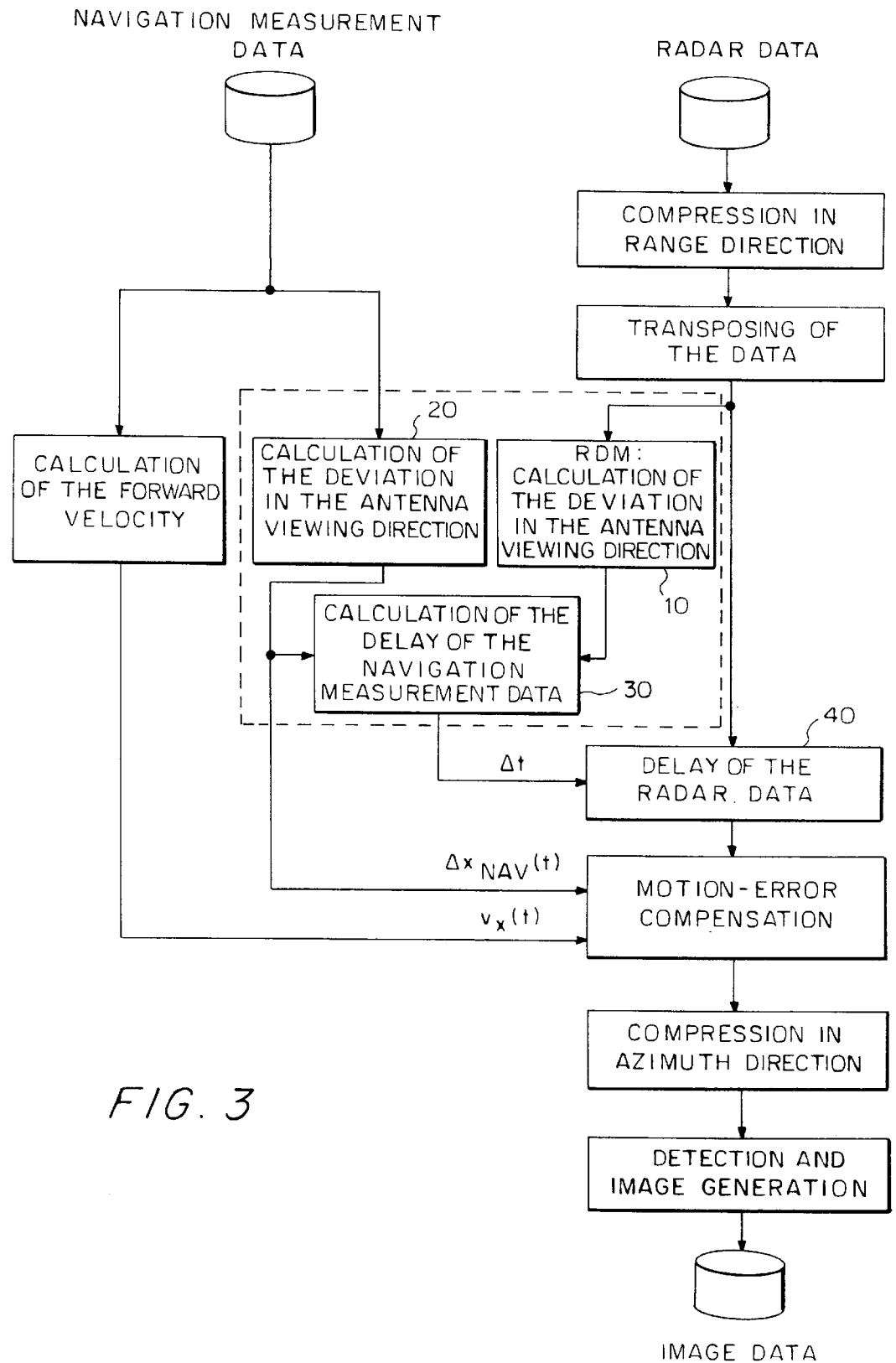
FIG. 3 is a detailed block diagram of the synchronization of the navigation measurement data.

FIG. 3 illustrates a detailed block diagram of the synchronization of the navigation measurement methods with the radar data, with reference to the device shown in FIG. 2. Here the radar data that have been compressed in the distance direction and subsequently transposed are supplied to a device 10 for calculating a deviation signal $\Delta r_{RDM}(t)$ in the antenna viewing direction.

The calculation can be effected by the reflectivity-displacement method. The navigation measurement data are supplied to a device 20 for calculating a deviation signal $\Delta r_{NAV}(t)$ in the antenna viewing direction. The time offset $\Delta t$ between the radar data and the navigation measurement data is determined in a device 30 for calculating the delay of the navigation measurement data. A device 40 for the time delay of the radar data by the amount $\Delta t$ is associated with the device 30 for compensating the time offset between the associated radar data and navigation measurement data.

Two significant requirements for the motion-error compensation of SAR systems are, on the one hand, the correct determination of the forward velocity $v_x(t)$ in the x direction and the deviation signal $\Delta r_{NAV}(t)$ of the carrier (aircraft) in the viewing direction (or "LOS", Line of Sight) of the antenna, which is also illustrated in FIG. 3. On the other hand, the radar data that have been delayed by the time offset $\Delta t$ by means of the device 40 are necessary for motion-error compensation.

Figure 4:
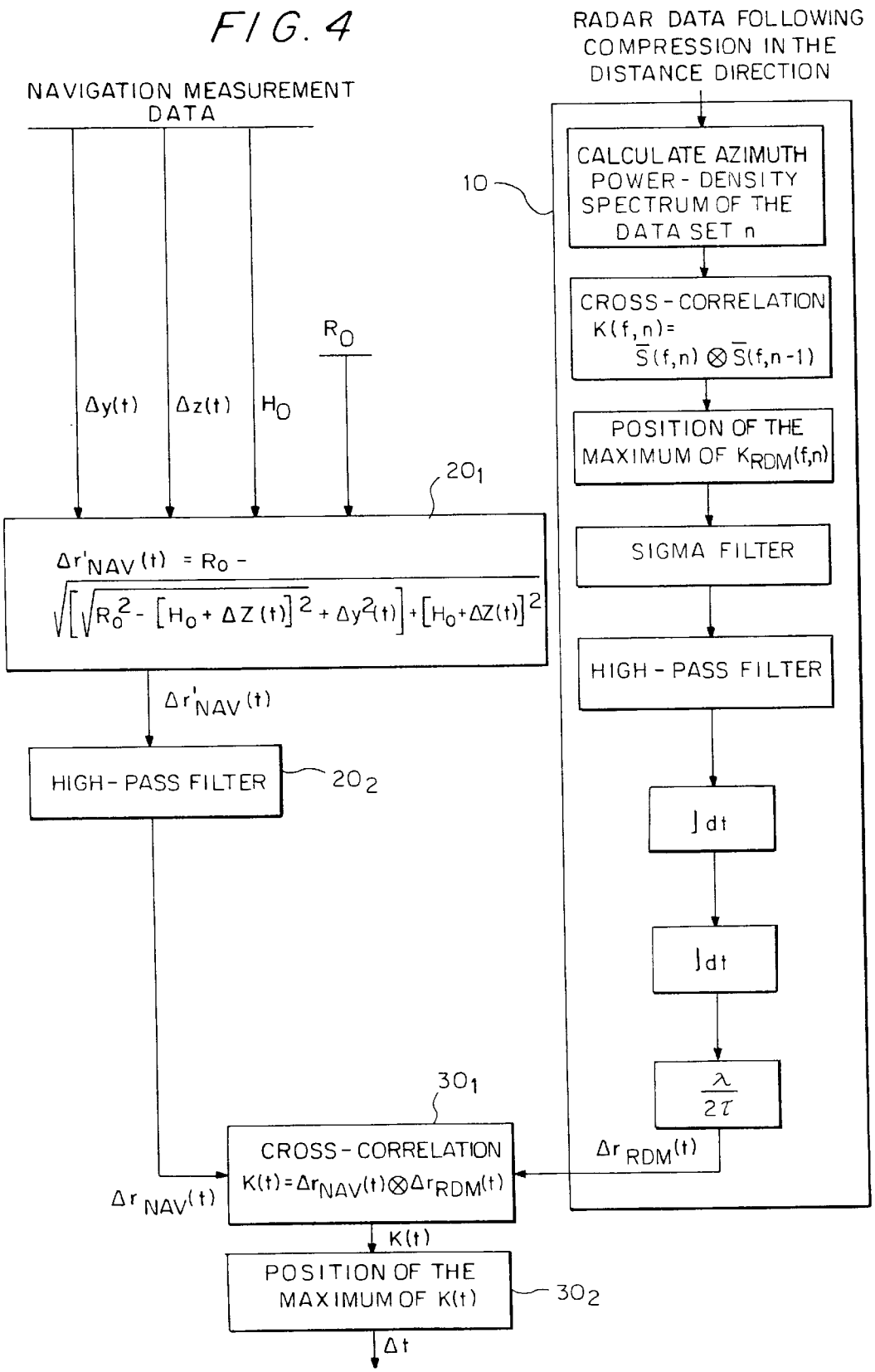
FIG. 4 is a detailed block diagram of the part of the circuit from FIG. 3 (shown in dashed lines) that is responsible for the calculation of the time offset between the radar and navigation measurement data, and therefore for synchronizing them.

FIG. 4 shows a detailed block diagram of the part of the circuit of FIG. 3, which is shown inside a dashed-line block and is responsible for calculating the time offset between the radar and navigation measurement data, and thus for synchronizing them.

The device 20 shown in FIG. 3 for calculating the deviation signal $\Delta r_{NAV}(t)$ in the antenna viewing direction includes a unit $20_1$, which processes the input signal $\Delta y(t)$ indicating the horizontal deviation of the aircraft from the nominal flight path, the input signal $\Delta z(t)$ indicating the variation in the flight height, the input signal $H_0$ indicating the average flight height above the ground, and the input signal $R_0$ indicating the minimum diagonal distance between the radar antenna and a point on the ground, in accordance with a method similar to that described in, for example, patent publications DE 42 25 413 and DE 44 03 190. This method generates the deviation signal $\Delta r'_{NAV}(t)$ of the aircraft in the antenna viewing direction. This deviation signal $\Delta r'_{NAV}(t)$ is determined as follows:

$$\Delta r'_{NAV}(t) = R_0 - \sqrt{\left[\sqrt{R_0^2 - [H_0 + \Delta z(t)]^2} + \Delta y^2(t)\right] + [H_0 + \Delta z(t)]^2} \quad (2)$$

or $$\Delta r'_{NAV}(t) = \Delta y(t) \cdot \cos\Theta_D - \Delta z(t) \cdot \sin\Theta_D, \quad (3)$$

where $$\sin\Theta_D = \frac{H_0}{R_0} \quad (4)$$

Here $R_0$ is the minimum set diagonal distance between the radar antenna and a point on the ground. The average flight height is indicated by $H_0$, and $\Theta_D$ describes the antenna depression angle. The correction phase is calculated as $$\varphi_{KORR}(t) = \frac{4\pi}{\lambda} \cdot \Delta r'_{NAV}(t). \quad (5)$$

The device 20 shown in FIG. 3 further includes a unit $20_2$, which adjoins the unit $20_1$, and represents a high-pass filter that is configured and tuned like a high-pass filter in the unit 10, which will be explained below. The unit $20_2$ therefore generates the output signal $\Delta r_{NAV}(t)$ from the deviation signal $\Delta r'_{NAV}(t)$.

The SAR image representation of present invention is optionally performed with motion-error compensation of the reflectivity-offset method similar to that described in patent publication DE 39 22 428 C2. The motion-error compensation with navigation measurement data of the present invention optionally and preferably is performed similarly to that described in patents DE 42 25 413 and DE 44 03 190.

This reflectivity-displacement method is a method of determining the motion errors of an SAR system that evaluates the raw radar data prior to the azimuth compression. The reflectivity-displacement method permits the determination of the deviation $\Delta r_{RDM}(t)$ of the carrier (e.g., aircraft) from the nominal flight path in the antenna viewing direction, and the forward velocity. The result is the following procedure of the reflectivity-offset method, as it is illustrated in FIG. 4:

1. Calculation of n azimuth power-density spectra S(f, n), one for each azimuth line (i.e., each ground position along the line containing point P which is parallel to the x-axis of FIG. 1).

2. Formation of n average power-density spectra $\overline{S}(f, n)$ through averaging of the power-density spectra of m adjacent azimuth lines, where preferably m=32.

3. Cross-correlation of the azimuth power-density spectrum $\overline{S}(f, n)$ with a previously-calculated spectrum $\overline{S}(f, n-1)$, i.e., $$K_{RDM}(f, n) = \overline{S}(f, n) \otimes \overline{S}(f, n-1). \quad (6)$$

for each n.

4. Detection of the maximum of the correlation result $K_{RDM}(f, n)$. The position of the maximum indicates the frequency offset of the reflectivity.

5. Recognition and correction, by the use of a sigma filter, of any cross-correlation errors. The causes of errors are essentially abrupt temporal changes in the reflectivity (i.e., in the reflectivity course).

6. Optionally, low-pass filtering of the temporal course of the previously-calculated frequency offsets (i.e. the frequency offsets as a function of time are low-pass filtered) can be performed to convert the forward velocity (parallel to the x-axis in FIG. 1) into the temporal course (i.e. conversion of the velocity into the position as a function of time). Variations from a smooth or uniform forward velocity will cause low-frequency offsets, and by filtering these can be isolated and used for later calculations requiring knowledge of forward velocity variations.

7. High-pass filtering of the temporal course of the frequency offsets for obtaining the acceleration in the antenna viewing direction (i.e., along $R_0$ in FIG. 1). The frequency-offset components of higher-frequency are caused by lateral accelerations. Therefore a high-pass filter (box 10 in FIG. 4) isolates the lateral deviations from a smooth flight in the antenna viewing direction, i.e. accelerations in the direction of the beam line or LOS, along $R_0$.

A two-fold integration (box 10 in FIG. 4) converts the accelerations into lateral distance deviations. A normalization follows for obtaining the deviation signal $\Delta r_{RDM}(t)$.

8. Finally, the values for correcting the transit-time errors of the radar pulses, and the correction-phase values, are calculated from the deviation signal $\Delta r_{RDM}(t)$.

The device 30 shown in FIG. 3 for calculating the delay of the navigation measurement data, and thus determining the time offset Δt between the radar data and the navigation measurement data, includes a unit $30_1$ for performing the cross-correlation known per se; the deviation signals $\Delta r_{NAV}(t)$ and $\Delta r_{RDM}(t)$ are supplied to this unit in the antenna viewing direction. The cross-correlation result K(t) is generated in the unit $30_2$ from these two deviation signals:

$$K(t) = \Delta r_{NAV}(t) \otimes \Delta r_{RDM}(t) \qquad (7)$$

A unit $30_2$, which determines the maximum of the correlation result K(t), is disposed downstream of the unit $30_1$ for executing the cross-correlation. The position of the maximum, or the abscissa value of the maximum, indicates the searched time offset Δt.

Further, advantageous possible uses of the method operating in accordance with the invention include LIDAR and sonar systems operating correspondingly in a radar system with a synthetic aperture.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. A method of correcting imaging signals generated from a wave unit mounted on a moving platform, wherein
   the platform includes a navigational system outputting a navigational deviation signal $\Delta r_{NAV}(t)$ indicative of deviations from a smooth platform motion;
   the wave unit outputs a wave deviation signal $\Delta r_{RDM}(t)$ indicative of the deviations from the smooth platform motion;
   the method comprising:
   deviation cross-correlating the navigational deviation signal $\Delta r_{NAV}(t)$ and the wave deviation signal $\Delta r_{RDM}(t)$ to obtain a cross-correlation result K(t);
   determining a maximum of the resulting cross-correlation result K(t) as a function of time;
   setting the cross-correlation result K(t) equal to a time offset Δt; and
   delaying the wave data by the time offset Δt prior to any image generation.

2. The method according to claim 1, wherein the platform comprises an aircraft or spacecraft, the wave unit comprises a radar, and the radar includes a radar antenna oriented perpendicular to the a flight direction and diagonally downward.

3. The method according to claim 1, wherein the wave unit comprises an on-board aircraft synthetic-aperture radar system.

4. The method according to claim 1, comprising steps of:
   using an expansion of pulses emitted from the wave unit to produce chirp pulses; and
   compressing received signals by a wave unit-pulse compression specific to the expansion.

5. The method according to claim 1, including a step of high-pass filtering both the navigational deviation signal $\Delta r_{NAV}(t)$ and the wave unit deviation signal $\Delta r_{RDM}(t)$ prior to the step of deviation cross-correlating;
   wherein the high-pass filtering is effected in the same manner for the navigational deviation signal $\Delta r_{NAV}(t)$ and for the wave unit deviation signal $\Delta r_{RDM}(t)$.

6. The method according to claim 1, wherein the wave unit comprises sonar.

7. The method according to claim 1, wherein the wave unit comprises LIDAR.

8. The method according to claim 1,
   wherein the deviations from the smooth platform motion are line-of-sight deviations and
   comprising a step of finding the wave unit deviation signal $\Delta r_{RDM}(t)$ by a reflectivity-offset method.

9. The method according to claim 1,
   wherein the deviations from the smooth platform motion are line-of-sight deviations and
   comprising generating the wave deviation signal $\Delta r_{RDM}(t)$ by steps of:
   denoting an ordered plurality of wave backscatter data sets by respective integers n, where n increases along a path parallel to motion of the moving platform;
   calculating a first power-density spectrum $\overline{S}(f, n-1)$ corresponding to an (n−1)th data set;
   calculating a second power-density spectrum $\overline{S}(f, n)$ corresponding to an nth data set;
   spectral cross-correlating the first power-density spectrum and the second power-density spectrum to obtain a correlation;

$$K_{RDM}(f, n) = \overline{S}(f, n) \otimes \overline{S}(f, n-1). \qquad (6)$$

integrating the correlation a first time to obtain a line-of-sight velocity function; and
   integrating the correlation a second time to obtain a line-of-sight displacement function.

10. The method according to claim 9, comprising a step, after the step of integrating the correlation a second time, comprising normalizing the displacement function, whereby a first amplitude of the wave deviation signal $\Delta r_{RDM}(t)$ is matched to a second amplitude of the navigational deviation signal $\Delta r_{NAV}(t)$ for correlation therebetween.

11. The method according to claim 9, comprising a step of sigma filtering after the step of spectral cross-correlating.

12. The method according to claim 11, comprising a step of high-pass filtering after the step of sigma filtering.

13. The method according to claim 9, comprising a step of high-pass filtering after the step of spectral cross-correlating.

14. The method according to claim 13, wherein the high-pass filtering is effected in a similar manner for the navigational deviation signal $\Delta r_{NAV}(t)$.

15. The method according to claim 9, comprising detecting a maximum $K_{RDM}(f, n)$ of the correlation prior to the step of integrating a first time.

16. An apparatus, mountable on a moving platform, for generating images from wave signals, comprising:
- a navigational system outputting a navigational deviation signal $\Delta r_{NAV}(t)$ indicative of deviations from a smooth motion of the platform;
- a wave unit receiving the wave signals and outputting a wave deviation signal $\Delta r_{RDM}(t)$ indicative of the deviations from the smooth motion of the platform;
- a deviation cross-correlator cross-correlating the navigational deviation signal $\Delta r_{NAV}(t)$ and the wave deviation signal $\Delta r_{RDM}(t)$ to obtain a cross-correlation result $K(t)$; and
- a determining unit determining a maximum of the resulting cross-correlation result $K(t)$ as a function of time and setting the cross-correlation result $K(t)$ equal to a time offset $\Delta t$; whereby
- the wave data is delayable by the time offset $\Delta t$ prior to any image generation to improve image quality.

17. The apparatus according to claim 16, comprising means for compressing the wave signals input to the wave deviation signal $\Delta r_{RDM}(t)$.

18. The apparatus according to claim 16, wherein the platform comprises an aircraft, and wherein the navigational system comprises a first unit ($20_1$), which processes
- an input signal $\Delta y(t)$ that indicates a horizontal deviation of the aircraft from a nominal flight path, an input signal $\Delta z(t)$ indicating a variation in the flight height,
- an input signal $H_0$ indicating an average flight height above the ground, and
- an input signal $R_0$ indicating a minimum diagonal distance between the aircraft and a point on the ground generating a reflected navigational signal $\Delta r'_{NAV}(t)$ indicating a deviation of the aircraft in the antenna viewing direction; and
- a second unit ($20_2$) that is disposed downstream of the first unit ($20_1$) to receive the reflected navigational signal $\Delta r'_{NAV}(t)$, the second unit comprising a second high-pass filter and being configured and tuned like a first high-pass filter used for calculating the deviation signal $\Delta r_{RDM}(t)$ in the antenna viewing direction, and generating the deviation signal $\Delta r_{NAV}(t)$ that is supplied to the unit ($30_1$) for executing the cross-correlation result $K(t)$.

19. An apparatus, mountable on a moving platform, for generating images from wave signals, comprising:
- means for outputting a navigational deviation signal $\Delta r_{NAV}(t)$ indicative of deviations from a smooth motion of the platform;
- means for receiving the wave signals and outputting a wave deviation signal $\Delta r_{RDM}(t)$ indicative of the deviations from the smooth motion of the platform;
- means for cross-correlating the navigational deviation signal $\Delta r_{NAV}(t)$ and the wave deviation signal $\Delta r_{RDM}(t)$ to obtain a cross-correlation result $K(t)$; and
- means for determining a maximum of the resulting cross-correlation result $K(t)$ as a function of time and setting the cross-correlation result $K(t)$ equal to a time offset $\Delta t$; whereby
- the wave data is delayable by the time offset $\Delta t$ prior to any image generation to improve image quality.

* * * * *